United States Patent
Fraze et al.

(10) Patent No.: US 7,753,207 B2
(45) Date of Patent: Jul. 13, 2010

(54) LIVING INTERPLANETARY FLIGHT EXPERIMENT CAPSULE

(75) Inventors: Raymond Edward Fraze, Hereford, AZ (US); Louis D. Friedman, Pasadena, CA (US)

(73) Assignee: The Planetary Society, Pasadena, CA (US)

( * ) Notice: Subject to any disclaimer, the term of this patent is extended or adjusted under 35 U.S.C. 154(b) by 90 days.

(21) Appl. No.: 12/098,441

(22) Filed: Apr. 6, 2008

(65) Prior Publication Data

US 2009/0250556 A1    Oct. 8, 2009

(51) Int. Cl.
*B65D 81/02* (2006.01)

(52) U.S. Cl. ........................................ 206/521; 206/527

(58) Field of Classification Search ................ 206/438, 206/486, 490, 521, 523, 591, 594, 527; 244/173.1, 244/173.3
See application file for complete search history.

(56) References Cited

U.S. PATENT DOCUMENTS

| | | | | | |
|---|---|---|---|---|---|
| 4,101,031 | A | * | 7/1978 | Cromie | 206/438 |
| 5,720,391 | A | * | 2/1998 | Dohm et al. | 206/438 |
| 5,823,342 | A | * | 10/1998 | Caudillo et al. | 206/438 |
| 6,199,696 | B1 | * | 3/2001 | Lytle et al. | 206/438 |
| 6,622,862 | B1 | * | 9/2003 | Corrado | 206/363 |
| 2002/0112981 | A1 | * | 8/2002 | Cooper et al. | 206/438 |

* cited by examiner

*Primary Examiner*—Luan K Bui
(74) *Attorney, Agent, or Firm*—Miller Nash LLP

(57) ABSTRACT

A light-weight capsule having internal components comprised of sample containers with living organisms in solid and liquid form, inner carrier, multiple seals is disclosed to protect the samples contained within and to withstand an impact of up to 4000 G in outer space or Earth applications being subject to extreme conditions of varying radiation, temperature, pressure, and shock. The present capsule provides a compact and durable design with features for reducing size, mass and weight while increasing strength, structural integrity, and sealing strength to protect the samples contained interiorly and to withstand extreme conditions for travel in deep space or inhospitable places on Earth.

22 Claims, 9 Drawing Sheets

LIVING INTERPLANETARY FLIGHT EXPERIMENT CAPSULE

BACKGROUND OF THE INVENTION

The present invention relates generally to a container that is able to withstand extreme external conditions in space for space applications as well as for earth applications. More specifically, the present invention is directed to a capsule containing live microorganisms that is transferred between planets for testing survivability or stored for an extended period of time in other inhospitable places on Earth.

In recent decades, life on Earth has been discovered to be more diverse and resilient than previously imagined and discovered. Extremophiles, microorganisms which survive and live in extreme conditions that are typically detrimental to the majority of life forms on Earth, have been found living in deep sea hydrothermal vents, locations with high radiation, inside salt crystals, and in many other places thought impossible for sustaining life only thirty or so years ago. Simultaneously, places like Mars, particularly in its distant past, and Jupiter's moon, Europa, have been discovered to be friendlier to life forms than previously expected because liquid water was discovered in Mars' past and highly likely to be present on Europa located beneath its ice crust. On Earth, all life forms require three essential sources for survival, including a source of carbon, energy source and liquid water. All of these have been present in the past or are present on places beyond Earth.

It is known that about 1 Martian meteorite hits Earth on a monthly basis, and about a billion tons of Martian rocks have landed on Earth ever since the solar system was formed. According to some statistics, as many as thirty meteorites have been identified to have originated from the Martian crust and transferred therefrom to Earth. Approximately one ton of Martian rock subject to major impact events has been ejected to Earth, enduring radiation, vacuum, gravity, and entry through a planetary atmosphere. It is estimated that one out of ten million of the Mars rocks arriving on Earth has spent less than one year in the interplanetary journey before arriving on Earth. Furthermore, it is estimated that every million years, approximately ten rocks larger than 100-150 g are transferred from Mars to Earth in only two to three years.

While major impact events are known to allow Martian or other planetary rocks from the outer surface of a particular planet to arrive at the surface of Earth while maintaining inner core temperatures low enough to keep from killing living organisms, it is unknown whether living organisms in fact have survived or could survive the interplanetary transfer phase. The mechanism for theoretical transfer or exchange of life between planets caused by ejection of surface rocks by major asteroid or comet impacts is known as "transpermia." Therefore, testing of the ability of organisms to survive transfer between planets becomes crucial. Such studies could help determine whether the interplanetary transfer of living organisms may have played an important role in the origins of terrestrial life. The travel and transfer of living organisms between planets, such as from Mars to Earth or Earth to Mars, vitally depends on whether it is possible for organisms to endure the interplanetary voyage.

Currently, little is known about living organisms in deep space, and living organisms surviving beyond the low Earth orbit (LEO) or Earth's magnetosphere into deep space for an extended period of time of at least three years or longer. Earth's magnetosphere is an area in which the influence of magnetic field protects orbiting near-Earth spacecrafts from the charged particle component of galactic cosmic radiation and solar particle events.

Testing to see whether living organisms can survive traveling between planets in deep space requires developing a simulated meteoroid that contains living organisms to fly aboard a spacecraft to deep space for an extended period of time. The transfer of the simulated meteoroid containing living organisms mimics the interplanetary transfer of living organisms in rocks. The simulated meteoroid also requires a specially designed container to protect the contained living organisms by retaining its structural integrity and intact seals after being subject to launch and the tremendous landing impact shock. The simulated meteoroid also requires a light weight container made of strong materials to minimize impact while providing strong sealing methods to mitigate launch and landing shock. The aim of the present invention is to also advance survivability knowledge of living organisms and transpermia over an extended period of time, such as three years or longer, in the interplanetary space environment. Another aim of the present invention is to create a durable and lightweight capsule to withstand tremendous pressure and extreme conditions and to maintain its multiple hermetic sealing for protecting the samples contained within the capsule for a period of three years or longer that is placed in inhospitable environments of Earth.

BRIEF SUMMARY OF THE INVENTION

The above-described problems are solved and a technical advance achieved by the present living interplanetary flight experiment ("LIFE") capsule or container. The present container provides a compact and durable design with features for reducing size, mass and weight while increasing strength, structural integrity, storage, and sealing strength required to withstand up to 4,000 times the acceleration of Earth's gravity ("4,000 G"), of impact as well as extreme conditions in outer space or here on Earth.

A LIFE capsule in accordance with an embodiment of the present invention is disclosed having an outer housing comprised of an upper housing portion and a lower housing portion. The upper housing portion is generally of a flat, circular and disk-like configuration that fits with the lower housing portion which is generally of a cylinder container configuration. Underneath the outer housing, a shock absorbing layer comprised of an upper shock absorbing layer, side shock absorbing layer, and lower shock absorbing layer which is made of silicone, polyurethane or other polymer materials mitigates and absorbs the tremendous impact and shock imposed on the capsule.

The LIFE capsule in accordance with an embodiment of the present invention is also disclosed having an inner carrier comprised of a top member and a base member. The top member is generally of a flat, disk-like configuration to fit over the base member. The base member contains a plurality of small openings and a large opening to hold each of the plurality of samples placed in the capsule so as to isolate them from each other to prevent contamination.

The LIFE capsule in accordance with an embodiment of the present invention is also disclosed having a first sealing means, a second sealing means and a third sealing means by which the internal components and the outer housing are hermetically sealed and protected against high impact, shock, varying pressures, radiation, and extreme conditions. The first sealing means comprises a means for sealing each of the plurality of small containers and a large container positioned in a plurality of small openings and a large opening respectively. The caps or covers are securely fastened over the plurality of small containers and the large container, or alternatively, the caps are integrally positioned on an underside of the top member to separately and uniformly seal each of the plurality of small containers and the large container.

The LIFE capsule in accordance with an embodiment of the present invention is also disclosed having a second sealing means. The second sealing means comprises a plurality of retaining members circumferentially placed on outer edges of the inner carrier and approximately evenly spaced so as to compress the top member and the base member, and a polymer o-ring positioned between the top and base members. The second sealing means further comprises a retaining tape to circumferentially adhere around a side surface of the top member and the base member compressed by the retaining members.

The LIFE capsule in accordance with an embodiment of the present invention is also disclosed having a third sealing means. The third sealing means comprises a means for compressing the upper housing portion and the lower housing portion with a malleable wire positioned in between the portions. The third sealing means also comprises slidably rotating a locking means integrally positioned on the outer edges of an underside of the upper housing portion and engaging a receiving means integrally positioned on the upper outer edges of the lower housing portion to seal the outer housing when the upper and lower housing portions are compressed together. Safety wires can optionally provide additional retaining measures by inserting the safety wires through the apertures vertically aligned on the outer edges of the upper housing portion and lower housing portion.

The LIFE capsule in accordance with an embodiment of the present invention is also disclosed having a total mass of less than 100 grams.

The LIFE capsule in accordance with an embodiment of the present invention is also disclosed having a cavity underneath the base member of the inner carrier to place dosimeter strips for detecting radiation.

The LIFE capsule in accordance with an embodiment of the present invention is also disclosed optionally including a coating of thermal paint on the outer housing for detecting extreme temperature changes for outer space applications.

The foregoing and other objectives, features, and advantages of the invention will be more readily understood upon consideration of the following detailed description of the invention, taken in conjunction with the accompanying drawings and claims.

BRIEF DESCRIPTION OF THE DRAWINGS

The invention is better understood in view of the accompanying drawing figures, in which like reference numerals refer to like elements throughout the following detailed description of the invention section, and in which.

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not be limited to the embodiments shown, but is to be accorded the widest scope consistent with the principles and features described herein. For purpose of clarity, details relating to technical material that is known in the technical fields related to the invention have not been described in detail.

An apparatus which is suitable for withstanding high pressure, impact and varying atmospheric conditions for an extended period of time and allowing samples internally contained to not be affected, generally includes an outer housing, shock absorbing pads, inner carrier, and varying multiple sealing means. The extended period of time during which the apparatus can be self-contained is at least thirty-six months or three years. As shown in FIGS. 1A-1D and 2A-2C, an example of a living interplanetary flight experiment (LIFE) capsule 5 has an overall substantially cylindrical shape and comprises two sections or outer housing portions. The LIFE capsule 5 provides an outer housing 10 with an upper housing portion 11 and a lower housing portion 20 encasing and protecting the internal components. It should be appreciated that the LIFE capsule 5 may generally have substantially any shape. Even though the outer housing 10 is generally of a cylinder configuration, the shape of the outer housing is not limited to a cylinder configuration and can have a rectangular, square, triangular or other poly-sided shape.

Figure 1A:
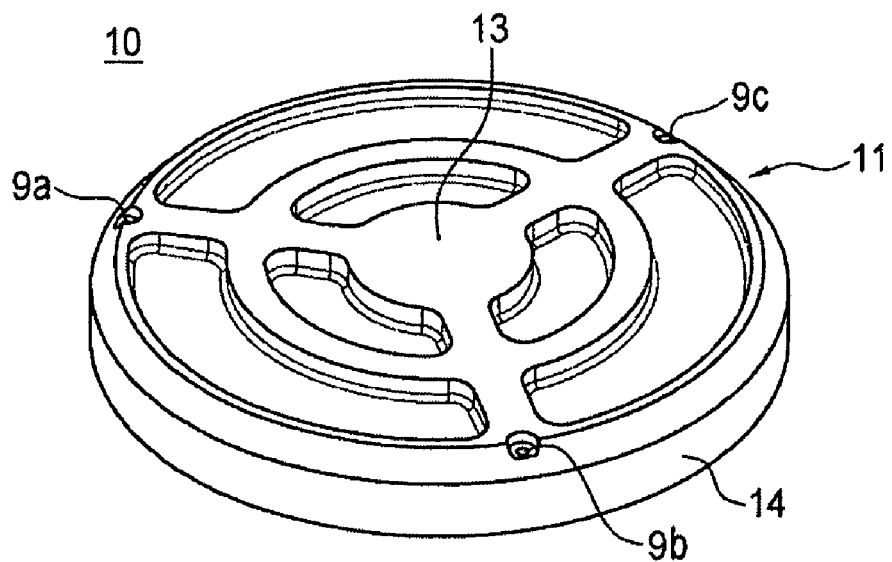
FIG. 1A is a perspective view of an upper housing portion of an outer housing frame for a LIFE capsule in accordance with an embodiment of the present invention.

FIG. 1A is a perspective view of an upper housing portion 11 of the outer housing frame 10 for the LIFE capsule 5 in accordance with an embodiment of the present invention. The upper housing portion 11 of the LIFE capsule 5 is generally of a flat, circular, and disk-like configuration. The lower housing portion 20 of the LIFE capsule 5 is generally of a cylinder container configuration. The outer housing frame 10 comprising the upper housing portion 11 and the lower housing portion 20 is a cylindrically symmetric housing frame with a cover with integrally positioned locking means for securely closing, engaging and locking the upper housing portion 11 over the lower housing portion 20. Although substantially any suitable material may be used to form the outer housing 20, the outer housing 10 is typically formed from a material which is light weight and is capable of withstanding immensely high impact, e.g., impact of up to 4,000 times the acceleration of Earth's gravity ("4,000 G") while retaining its structural integrity. Suitable materials from which the outer housing 10 may be formed include, but are not limited to, titanium, titanium containing materials or other similarly light weight material with a high modulus of strength.

Figure 1B:
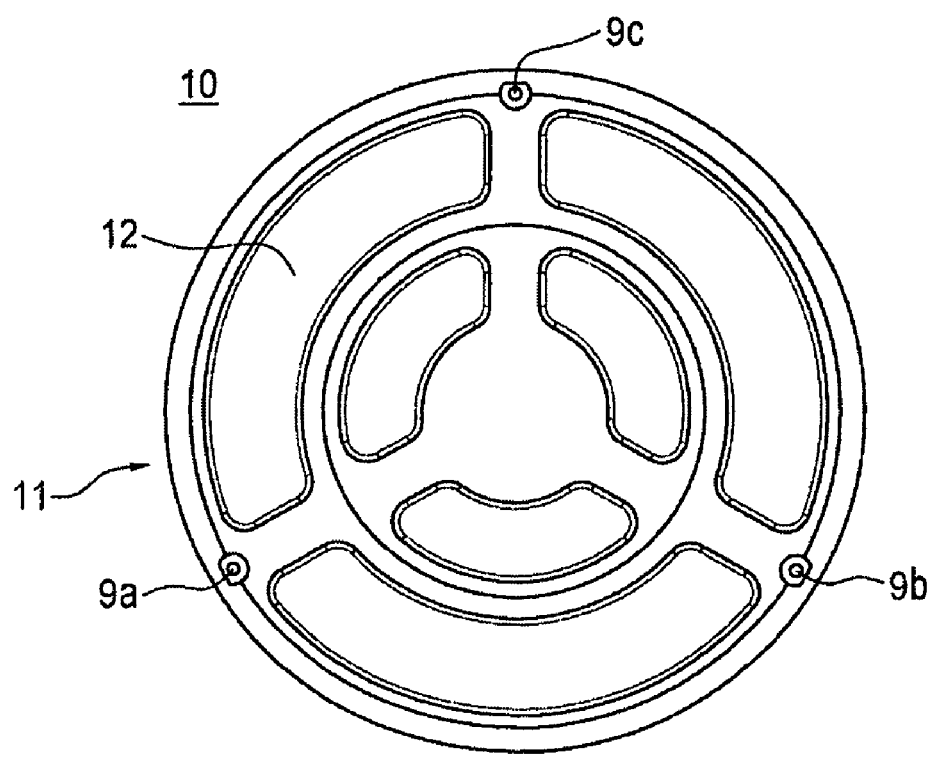
FIG. 1B is a top plan view of the upper housing portion of the LIFE capsule in accordance with an embodiment of the present invention.

As shown, FIG. 1B illustrates a top plan view of the upper housing portion 11 of the LIFE capsule 5 in accordance with an embodiment of the present invention. The example of the upper housing portion 11 of the outer housing 10 has a top surface 23 with optional indentations 12 in any shape or pattern for primarily reducing the weight of the outer housing 10, thereby reducing the overall weight of the LIFE capsule 5. The optional indentations 12 in a design of a waffle type is easily machinable and manufacturable for aerospace structural applications. It should be appreciated that the design of the indentations on the top surface of the upper housing portion may generally have substantially any shape and is not limited to a waffle design. For outer space applications, the entire LIFE capsule 5 mass is preferably under 100 grams to minimize on board spacecraft mass. The LIFE capsule 5 is securely placed inside a sample entry vehicle for ascent into deep space and descent back to Earth. For Earth applications such as in deep seawater or for other inhospitable conditions, the mass of the LIFE capsule 10 can vary depending on the application and exceed the requirement of 100 grams. On the outer topside surface 13 of the upper housing portion 11, there is optionally at least two apertures 9a, 9b, 9c which are evenly spaced on the outer circumference and vertically open for allowing safety wires 80 (shown in FIGS. 3 and 7A) to be connected therethrough. The positioning of the safety wires 80 is more readily understood in later FIGS. 3 and 7A after the entire capsule 5 is completely sealed and packaged for use.

Figure 1C:
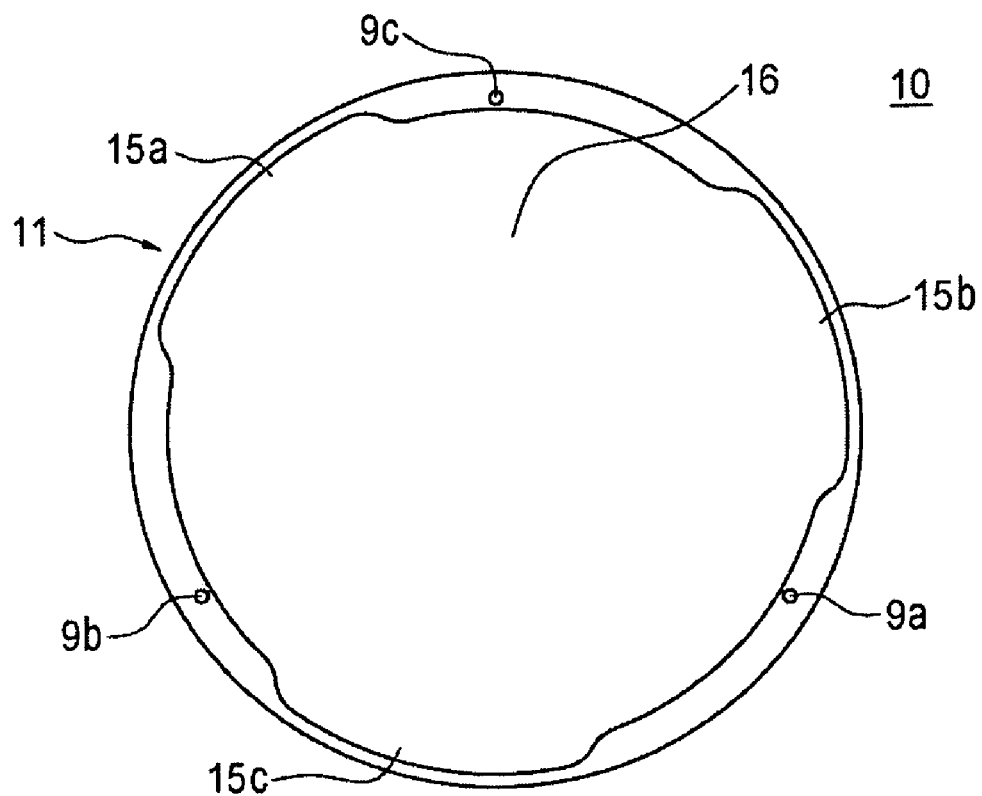
FIG. 1C is a bottom plan view of the upper housing portion of the LIFE capsule in accordance with an embodiment of the present invention.

FIG. 1C illustrates a bottom plan view of the upper housing portion 11 of the LIFE capsule 5 in accordance with an embodiment of the present invention. As shown in FIG. 1C, each of the locking means 15a, 15b, 15c is comprised of an outwardly protruding clasp-like member and is integrally positioned on the outer underside 16 of the upper housing portion 11 to slidably clasp and lock over each of the integrally positioned receiving members 25a, 25b, 25c of the lower housing portion (shown in FIGS. 2A-2C). Even though the example of FIG. 1C demonstrates the three, integral locking means 15a, 15b, 15c, any number of or other locking means can be adopted to securely lock the upper housing portion 16 with its lower housing portion 20 using any locking, securing, fastening or attaching mechanism. On the underside top surface 16 of the upper housing portion 11, the optionally at least two apertures 9a, 9b, 9c are illustrated which are evenly spaced on the outer circumference and vertically open for allowing safety wires 80 (shown in FIGS. 3 and 7A) to be connected therethrough for additional retaining purposes.

Figure 1D:
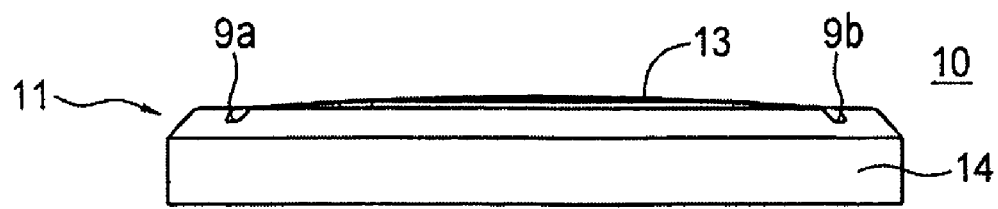
FIG. 1D is a side view of the upper housing portion of the LIFE capsule in accordance with an embodiment of the present invention.

As shown in FIG. 1D, a side view of the upper housing portion 11 is illustrated in accordance with an embodiment of the present invention. The example of the upper housing portion 11 has a side surface 14, topside surface 13, and the at least two apertures 9a, 9b, 9c (shown in FIG. 3). The diameter of the apertures 9a, 9b, 9c is approximately equal to the diameter of the safety wires 80. The at least two apertures 9a, 9b, 9c allow safety wires 80a, 80b, 80c (shown in FIG. 3) to fit therethrough for providing additional safety and precautionary retaining measures against the upper housing portion 11 from blowing out or away from the lower housing portion 20 under high pressure and impact. The positioning of the safety wires 80a, 80b, 80c is more readily understood in later FIGS. 3 and 7A after the entire capsule 5 is completely sealed and packaged for use in different applications.

Figure 2A:
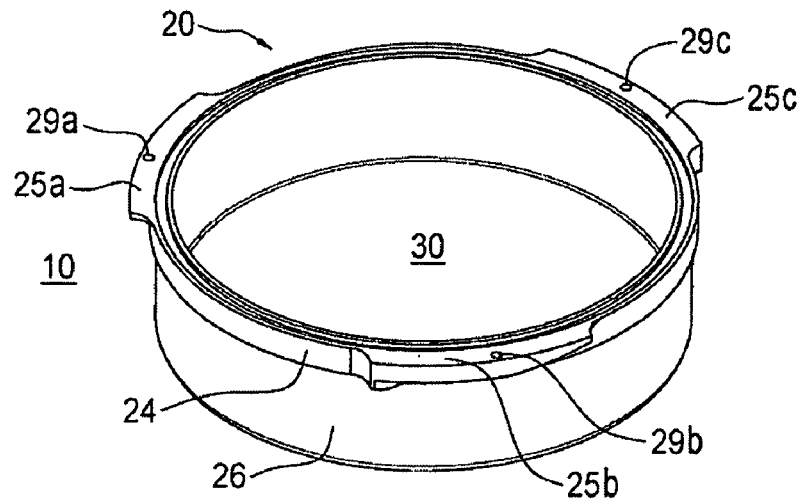
FIG. 2A is a perspective view of a lower housing portion of the outer housing frame for the LIFE capsule in accordance with an embodiment of the present invention.

As shown in FIG. 2A, a perspective view of a lower housing portion 20 of the outer housing frame 10 for the LIFE capsule 5 is illustrated in accordance with an embodiment of the present invention. The lower housing portion 20 of the outer housing frame 10 is generally of a cylinder container configuration. It should be appreciated that the lower housing portion 20 may generally have substantially any shape and is not limited to a cylindrical configuration as long as it is complementary to the upper housing portion 20 in encasing the internal components. The interior space 30, created by the inner side and bottom surfaces of the lower housing portion 20, retains and fits in all the internal components as described in more detail in later FIGS.

The interior space 30 retains the internal components which are safely sealed and securely contained within the outer housing 10. The lower housing portion 20 has a side, cylindrical surface 26 and an upper side surface 24. On the outer edges of the upper side surface 25 around the circumferential area of the lower housing portion 20, each of the receiving members 25a, 25b, 25c are shown to be protruding outwardly and integrally positioned on the lower housing portion 20 for slidably engaging and receiving the locking means 15a, 15b, 15c over the receiving members 25a, 25b, 25c for locking the two housing portions 11, 20. By aligning the upper housing and lower housing portions 11, 20, more specifically, the upper locking means 15a, 15b, 15c over the lower receiving means 25a, 25b, 25c, the locking means 15a, 15b, 15c can be slidably rotated on and over the receiving means 25a, 25b, 25c until the locking means 15a, 15b, 15c of the upper housing portion 11 are securely engaged and locked with the receiving means 25a, 25b, 25c of the lower housing portion 20.

Figure 2B:
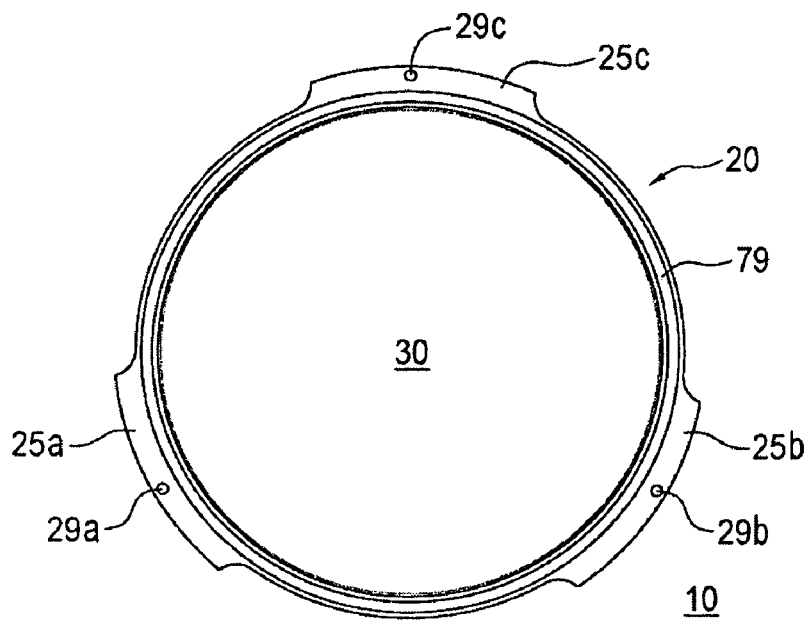
FIG. 2B is a top view of a lower housing portion of the LIFE capsule in accordance with an embodiment of the present invention.
Figure 2C:
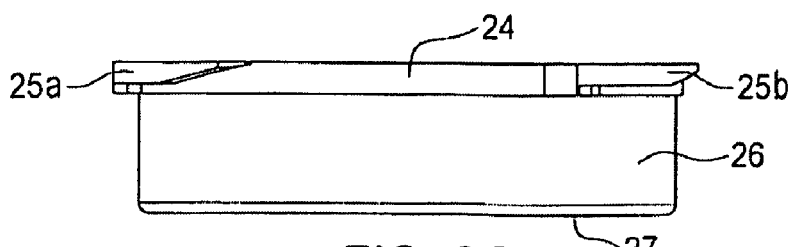
FIG. 2C is a side view of a lower housing portion of the LIFE capsule in accordance with an embodiment of the present invention.

As shown in FIGS. 2A-2B, each of the at least two apertures 29a, 29b, 29c is located at the center of each of the receiving means 25a, 25b, 25c respectively which aligns vertically with the apertures 9a, 9b, 9c of the upper housing portion 11 to allow safety wires 80a, 80b, 80c (shown in FIG. 3) to fit therethrough for providing additional safety and retaining measures against the upper housing portion 11 from blowing away from the lower housing portion 20 under high pressure and impact. The diameter of the apertures 29a, 29b, 29c is relatively equal to the diameter of the safety wires 80a, 80b, 80c. FIG. 2C illustrates the receiving means 25a, 25b as located on the upper side surface 24 of the lower housing portion 20 which slidably engage and securely lock the locking means 15a, 15b, 15c.

Figure 3:
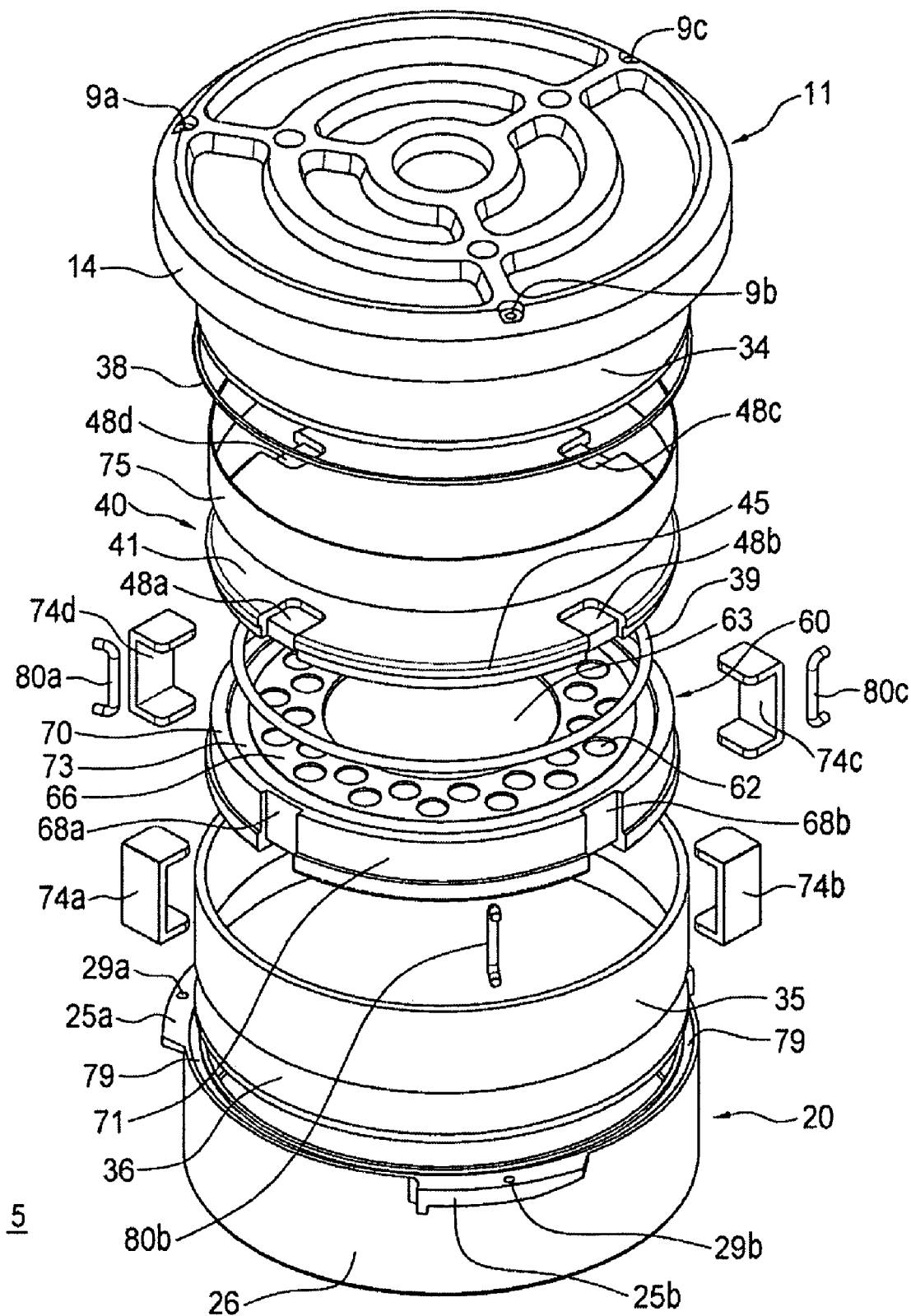
FIG. 3 is an exploded view of the LIFE capsule in accordance with an embodiment of the present invention, showing details of internal elements.

FIG. 3 is an exploded view of the LIFE capsule in accordance with an embodiment of the present invention, showing details of internal elements. The example of the LIFE capsule 5 can be best understood with reference to the complete assembly as illustrated in FIG. 3. The outer housing 10, comprised of the upper housing portion 11 and the lower housing portion 20, houses and contains the internal components of the LIFE capsule 5. Immediately beneath the outer housing 10 is a shock absorbing layer 34, 35, 36, comprising an upper shock absorbing layer 34, a side shock absorbing layer 36, and a lower shock absorbing layer 35, made of shock-absorbing materials, such as silicone, polyurethane, or other polymer materials. By interfacing the outer housing 10 and the internal components with the upper, side and lower shock absorbing layers, the impact and landing shock is mitigated and absorbed to protect the internal components, thereby samples contained within the capsule 5.

Immediately beneath the shock absorbing layer 34, 35, 36, the LIFE capsule 5 contains an inner carrier 43 comprised of a top member 40 and a base member 60 for carrying and accommodating samples in a form of liquid and solid. The top member 40 is generally of a flat, disk-like configuration to cover over the base member 60 to contain liquid or solid samples. On the outer edges of the top member 40, the top member 40 has at least three recesses 48a, 48b, 48c, 48d on and in which a retaining member 74 fits by aligning at least three recesses of the base member 68a, 68b, 68c, 68d to retain the top member 40 and the base member 60 together as later described in more detail for retaining and securely sealing the samples within the inner carrier 43. In this example of FIG. 3, the base member 60 is generally a cylindrically symmetric configuration. The base member 60 has a plurality of openings comprised of a plurality of small openings 62 and a large opening 63. The plurality of small openings 62 can accommodate and hold a plurality of small containers 64 (shown in FIG. 4) for holding multiple small volume liquid or solid samples. The large opening 63 can accommodate larger samples whether solid or liquid. The large opening 63 can optionally hold a large container (shown in FIG. 4) with a cover 50 and a lower large container portion 52 for further separating the larger samples from the smaller samples contained in the plurality of small containers 64.

Figure 4:
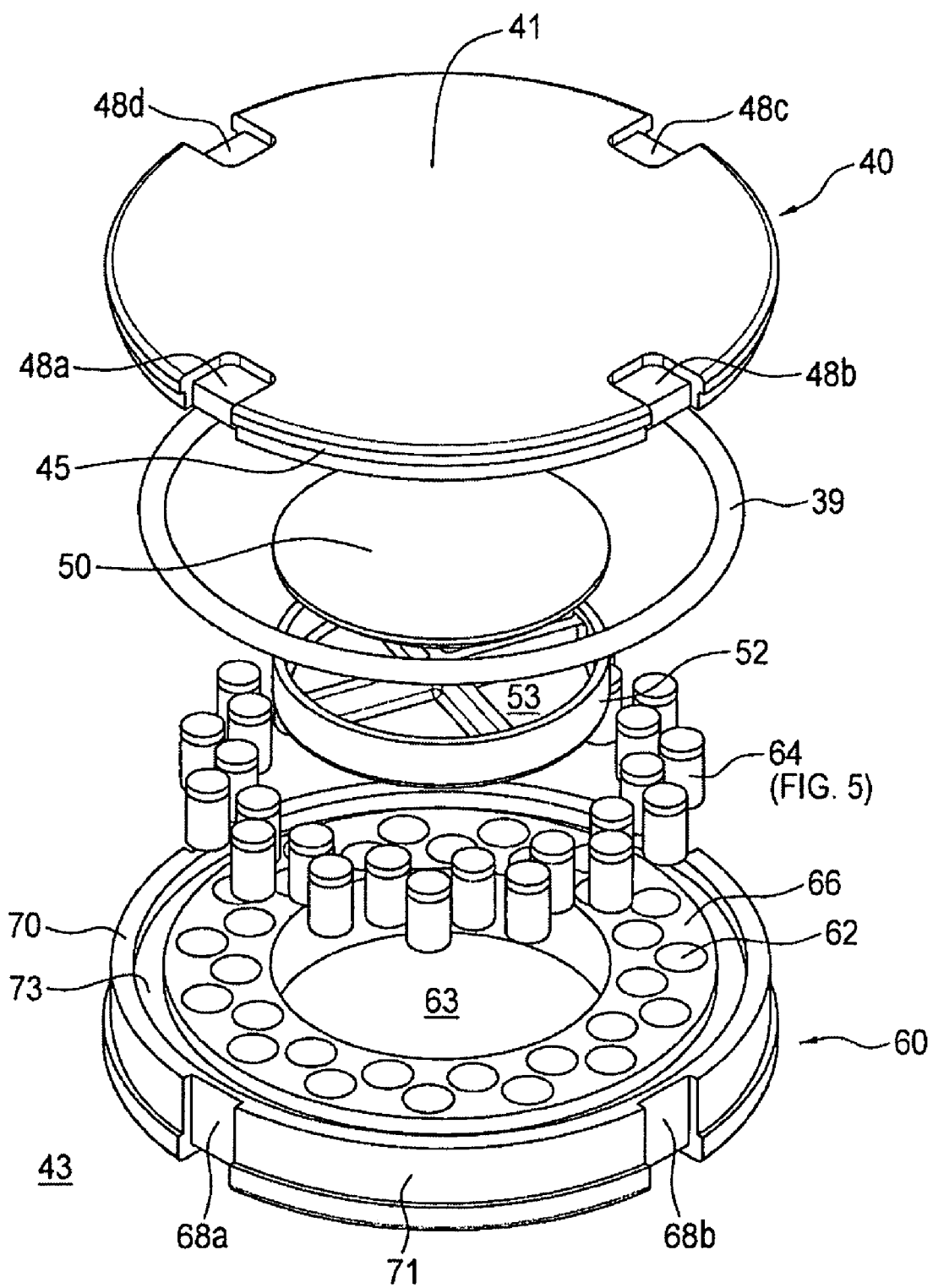
FIG. 4 is an exploded view of an inner carrier of the LIFE capsule in accordance with an embodiment of the present invention, showing a plurality of small containers and a large container.

In FIG. 4, the inner carrier 43 comprising the top member 40 and base member 60 is shown in an exploded view with a plurality of small containers 64 and a larger container. In this example of FIGS. 4-6, the plurality of small openings 62 accommodate a plurality of small containers 64 for containing multiple liquid or solid samples in smaller volumes. The large opening 63 can accommodate and hold larger samples or a larger container comprised of a cover 50 and lower larger container portion 52. The diameter of the large opening 63 is approximately 26 mm. The lower larger container portion 52 with a cover 50 as the larger container fits within the large opening 63 for containing and enclosing larger samples. It should be appreciated that the layout and size of the plurality of openings may generally have substantially any layout design and size depending on the application. Furthermore, the layout of the position and size of the plurality of openings can be modified to accommodate small, medium to large-sized liquid or solid samples or a variation of differently sized samples. In the example of the base member 60 of the inner carrier 43, the plurality of small openings 62 are cylindrical in shape and accommodate and hold a plurality of small containers 64 which are approximately 3 mm in diameter. In this example, the plurality of small openings 62 are vertically positioned on the outer areas of the base member 60. The large opening 63 of the base member 60 is centrally located in the inner area of the base member 60.

Although substantially any suitable material may be used to form the top member 40 and the base member 60 for carrying various samples, the top and base members 40, 60 are typically formed from a material which is lightweight and is capable of withstanding varying pressures and temperatures. Furthermore, the top and base members 40, 60 are easily sterilizable and machinable. The sterilizability of the top and base members 40, 60 are important for containing and carrying samples of living organisms, more specifically, living microorganisms, and becomes important to prevent contamination from each sample contained in the plurality of small containers 64 and the large container 50, 52. Although any solid or liquid samples can be implemented for Earth applications and LEO settings, a particular example of the present invention for deep space application includes selection of living microorganisms with radiation resistance and with the ability to metabolize lithotrophically for voyage through all mission phases, from the launch, interplanetary travel to Mars-analog or other planets, and back to landing on Earth. It should be appreciated that any living or nonliving samples in the form of liquid or solid can be adopted for the present invention for both Earth and outer space applications.

The machinability of the top and base members 40, 60 is important in reducing mass of the overall weight of the LIFE capsule 5, particularly for keeping the mass under 100 grams for outer space applications for minizing on board spacecraft mass. Suitable materials from which the top and base members 40, 60 may be formed include, but are not limited to, ceramic, glass, other similarly light weight, durable materials, or a combination of various light weight materials and which are capable of withstanding varying temperatures and pressures.

Figure 6A:
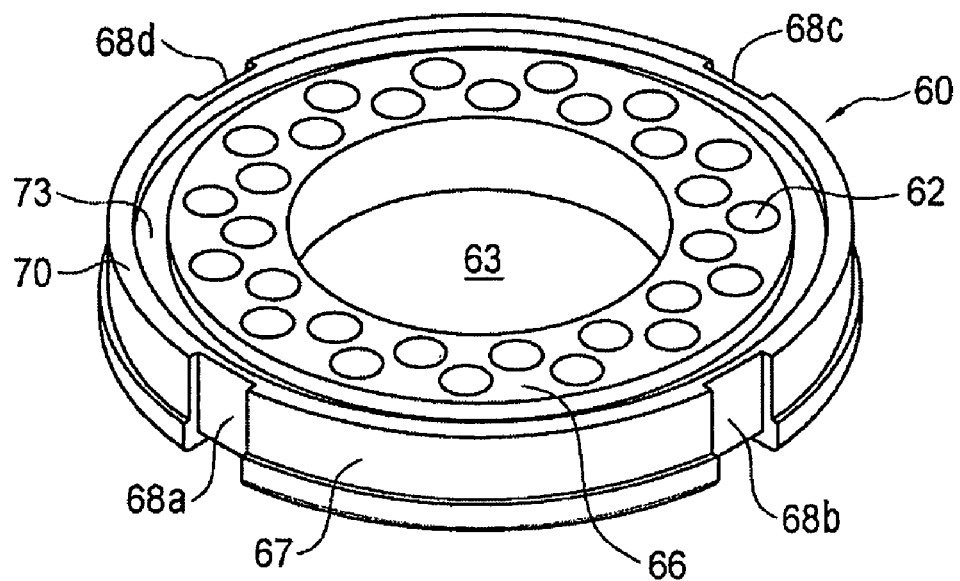
FIG. 6A is a perspective view of a base member of the inner carrier for the LIFE capsule in accordance with an embodiment of the present invention.
Figure 6B:
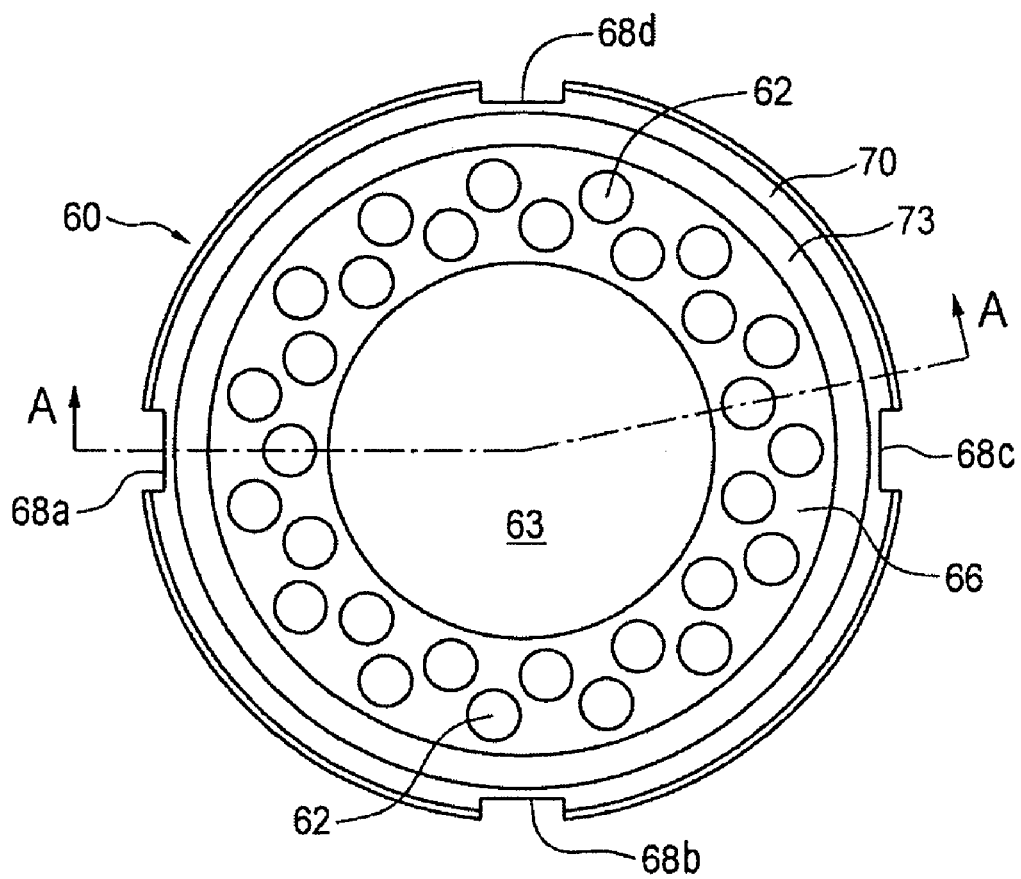
FIG. 6B is a top view of the base member of the inner carrier for the LIFE capsule in accordance with an embodiment of the present invention.
Figure 6C:
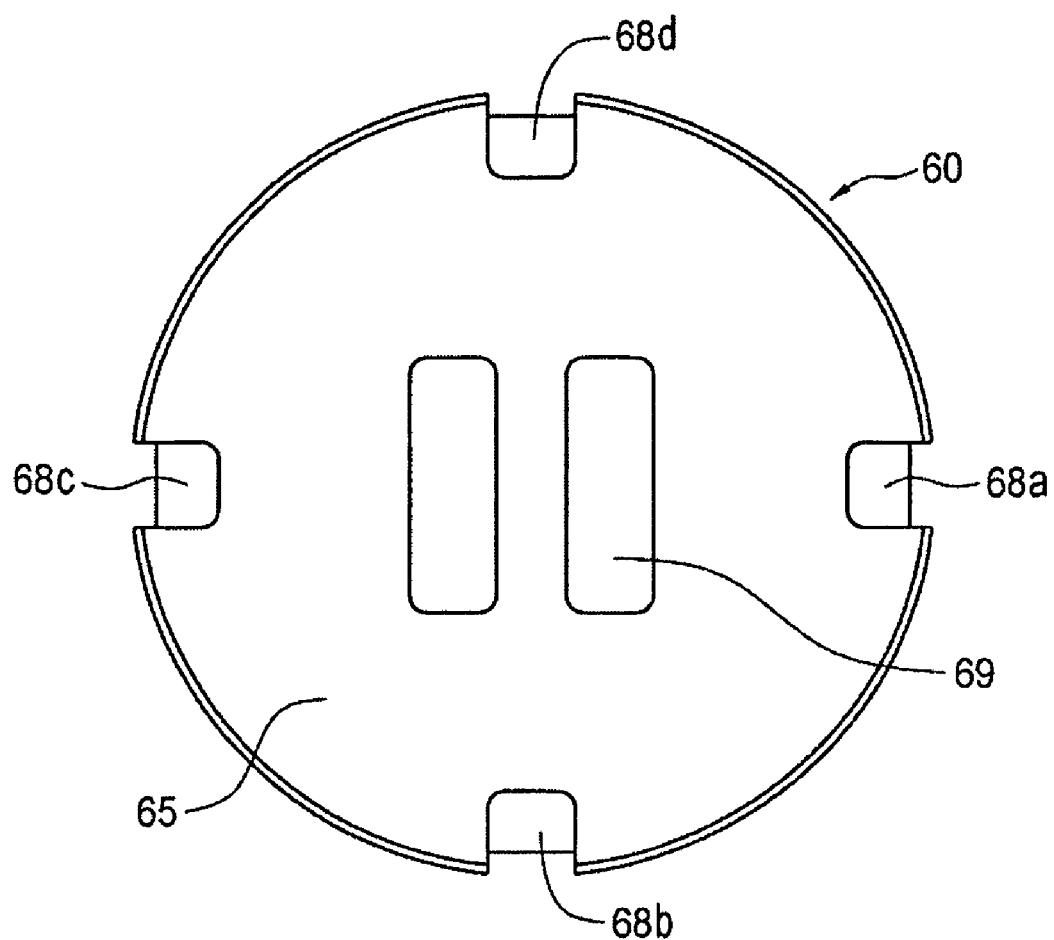
FIG. 6C is a bottom plan view of the base member of the inner carrier for the LIFE capsule in accordance with an embodiment of the present invention.
Figure 6D:
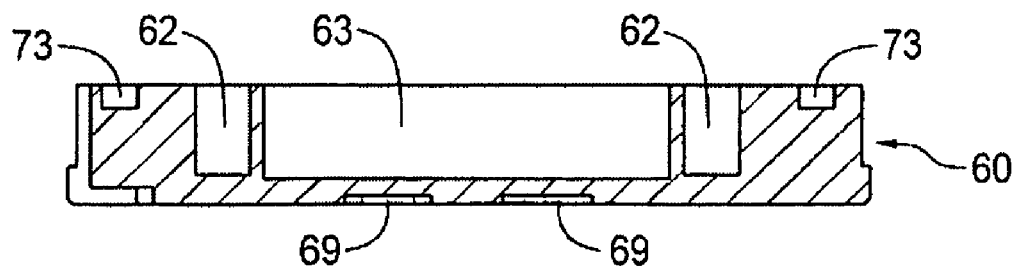
FIG. 6D is a cross-sectional view of the inner carrier for the LIFE capsule in accordance with an embodiment of the present invention.

In FIG. 6A, a perspective view of a base member 60 of the inner carrier 43 is illustrated in accordance with an embodiment of the present invention with the plurality of openings comprised of the plurality of small openings 62 and the large opening 63. The recesses 68a, 68b, 68c, 68d of the base member 60 align with the recesses 48a, 48b, 48c, 48d of the top member 40 for accommodating the retaining members 74a, 74b, 74c, 74d to securely engage the top and base members 40, 60. In FIG. 6C, a bottom plan view of the base member 60 of the inner carrier 43 for the LIFE capsule 5 is illustrated in accordance with an embodiment of the present invention. As shown in FIG. 6C, the underside surface 65 of the base member 60 optionally has two cavities 69 in which two small dosimeter strips can be inserted. The dosimeter strips can be used to measure the level of radiation over an extended period of time. In FIG. 6D, a cross-sectional view of the inner carrier 43, more specifically, the base member 60 for the LIFE capsule 5 is illustrated in accordance with an embodiment of the present invention. The central large opening 63 is shown to accommodate and to contain larger samples or a larger container comprised of the lower larger container portion 52 with a cover 50 for holding larger samples. The underside cavities 69 are also illustrated in this cross-sectional view of the base member 60 to optionally accommodate and hold dosimeter strips.

Figure 5:
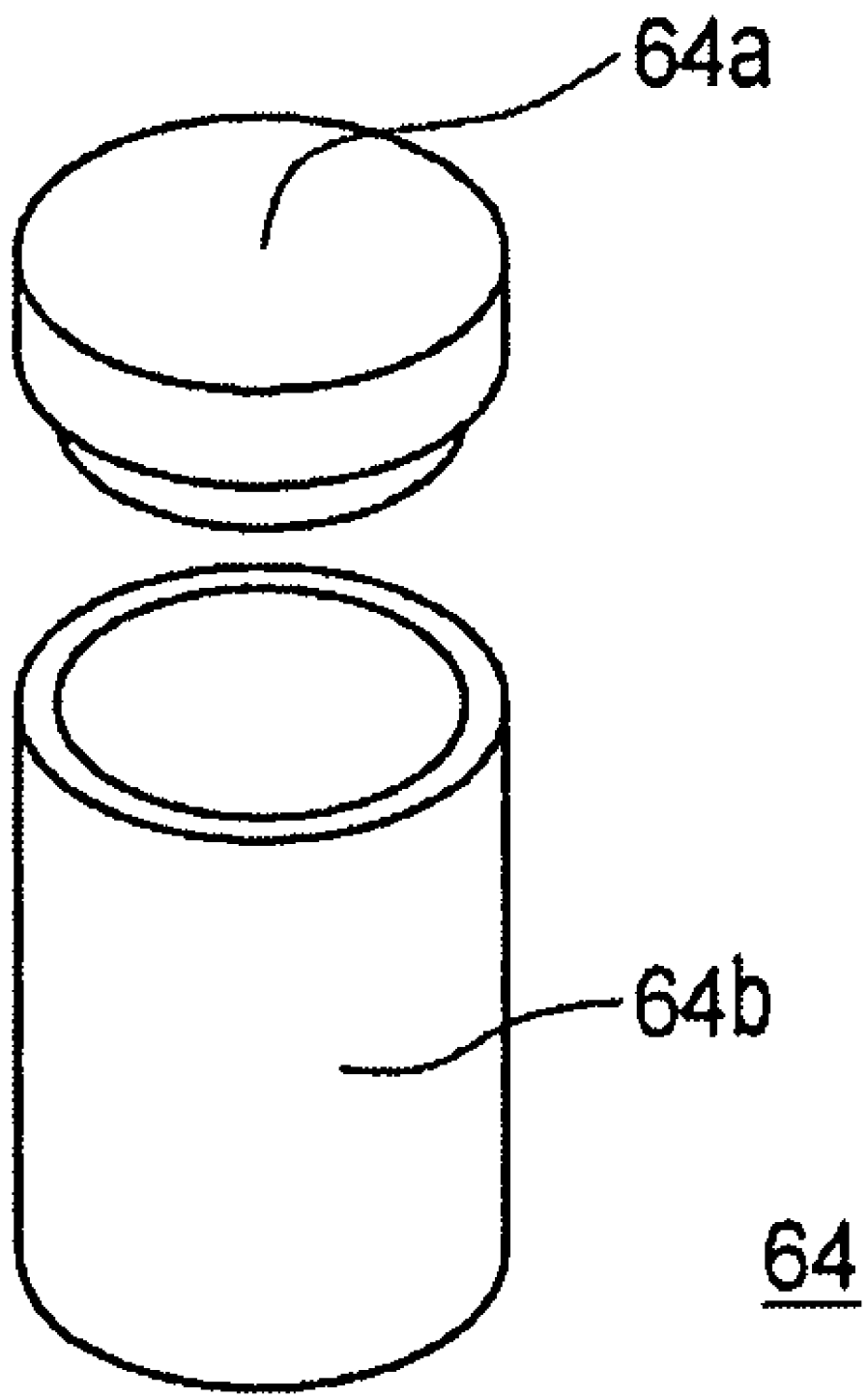
FIG. 5 is a perspective view of a small container from a plurality of small containers that sits in each of the plurality of small openings of the base member of the inner carrier for the LIFE capsule in accordance with an embodiment of the present invention.

The plurality of sample containers 64 containing small samples are inserted into the plurality of small openings 62. As shown in FIGS. 5 and 6, each of the plurality of small containers 64 has a cap 64a to close over the body 64b acting as a first sealing mechanism. The interior space 61 (shown in FIG. 7B) of the sample container 64 contains approximately several $mm^3$ of volume amount. Each of the entire sample container 64 comprised of the cap 64a and body 64b containing a sample is inserted into each of the plurality of small openings 62. Alternatively, each of the plurality of the sample containers 64 is inserted into each of the plurality of small openings 62 without a cap 64a because the plurality of caps 58 can be integral and attached to the underside surface of the top member 40 to fit over the plurality of small containers 64 as more readily shown in FIG. 7B. The larger container containing larger samples in its interior cavity 53 has a lower larger container portion 52 which is tightly capped or sealed with the cover 50 and inserted into the large opening 63. Suitable materials from which the plurality of small containers 64 and large container 50, 52 may be formed include, but are not limited to polymer or other similarly durable materials, and which are capable of withstanding a wide range of temperatures and pressures.

As a secondary sealing mechanism, a second sealing means 39 or substantially an o-ring is laid down on the outer topside surface 70 of the base member 60 to sandwich and tightly seal the top member 40 against the base member 60. As more readily illustrated in a cross-sectional view of the base member 60 in FIG. 6D, the second sealing means 39 fits into a groove 73 of the base member 60 before compressing the top and base members 40, 60 against each other and together. Suitable materials from which the o-ring 30 may be formed include, but are not limited to, silicone, polymer, or other similarly strong and durable sealing materials. The top and base members 40, 60 are further retained by securely positioning and fitting a plurality of retaining members 74a, 74b, 74c, 74d in the recesses 48a, 48b, 48c, 48d of the top member 40 and the recesses 68a, 68b, 68c, 68d of the base member 60. The plurality of retaining members 74a, 74b, 74c, 74d are substantially C-shaped to horizontally and vertically retain the top member 40 and the base member 60. The plurality of retaining members 74a, 74b, 74c, 74d provide pressure to seal the top member 40 and the base member 60 together. The vertical height of the plurality of retaining members 74a, 74b, 74c, 74d is the thickness of the inner carrier 43 containing the samples. It should be appreciated that the size of the retaining members 74a, 74b, 74c, 74d may generally have substantially any width and length. Suitable materials from which the retaining members 74a, 74b, 74c, 74d may be formed include, but are not limited to, titanium, titanium containing materials or other similarly light weight material with a high modulus of strength.

After the plurality of retaining members 74a, 74b, 74c, 74d are positioned snugly into place or the recesses 48a, 48b, 48c, 48d, 68a, 68b, 68c, the retaining members 74a, 74b, 74c, 74d are further securely retained in place by circumferentially and tightly surrounding the side surfaces of the top member 40 and base member 60 with a retaining strip 75 or generally a retaining tape. Suitable materials from which the retaining strip 75 may be formed include, but are not limited to, metal, Kapton or other similarly durable materials, and which are capable of withstanding a wide range of temperatures and pressures. The inner carrier 43 containing the samples, after being packaged and sealed, is inserted into the lower housing portion 20, and the upper housing portion 11 is rotatably and securely engaged over the lower housing portion 20, particularly the locking means 15a, 15b, 15c over the receiving means 25a, 25b, 25c.

For a tertiary sealing mechanism, a third sealing means 38 or substantially a wire is placed into a groove 79 which is located on the upper and outer edges of the lower housing portion 20 before securely compressing and sealing the upper housing portion 11 and the lower housing portion 20 together. Suitable materials from which the third sealing means 38 or wire may be formed include, but are not limited to, Indium, Indium containing materials, or other closely resembling metals or materials, and which are capable of withstanding a wide range of temperatures and pressures. In this example, the third sealing means 38 is permanently crushed to seal the outer housing 10 between the upper housing and lower housing portions 11, 20 by using a malleable Indium wire or other malleable wire. After the upper and lower housing portions 11, 20 are securely and optionally permanently attached, the apertures 9a, 9b, 9c of the upper housing portion 11 and the apertures 29a, 29b, 29c of the lower housing portion 20 with vertical alignment allow the safety wires 80a, 80b, 80c to provide additional containment to the LIFE capsule 5.

Simultaneously with the crushing of the Indium wire between the upper housing portion 11 and the lower housing portion 20 together, the upper housing and lower housing portions 11, 20 are aligned, more specifically, the upper locking means 15a, 15b, 15c over the lower receiving means 25a, 25b, 25c are aligned so that the locking means 15a, 15b, 15c can be slidably rotated on and over the receiving means 25a, 25b, 25c until the locking means 15a, 15b, 15c of the upper housing portion 11 are securely engaged and locked with the receiving means 25a, 25b, 25c of the lower housing portion 20 to provide the complete tertiary sealing mechanism.

Figure 7A:
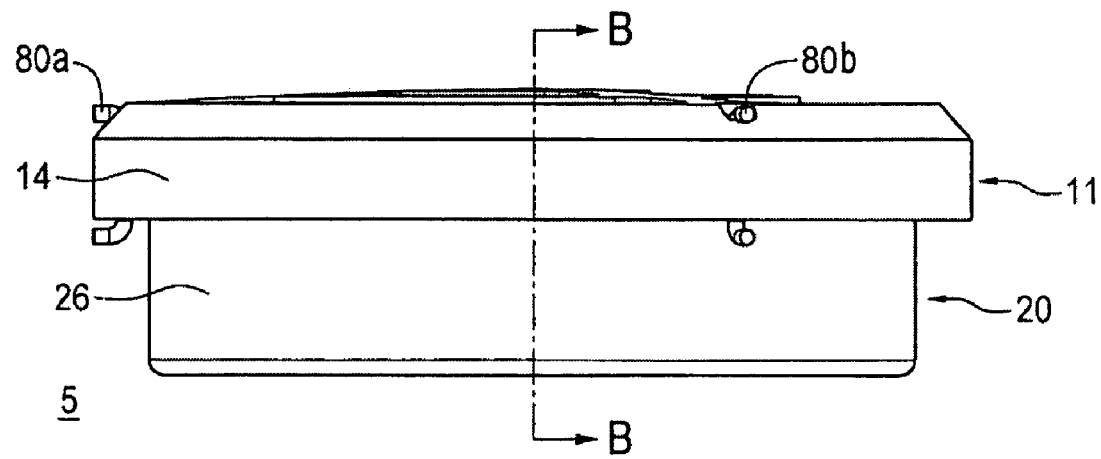
FIG. 7A is a side view of the LIFE capsule in accordance with an embodiment of the present invention.
Figure 7B:
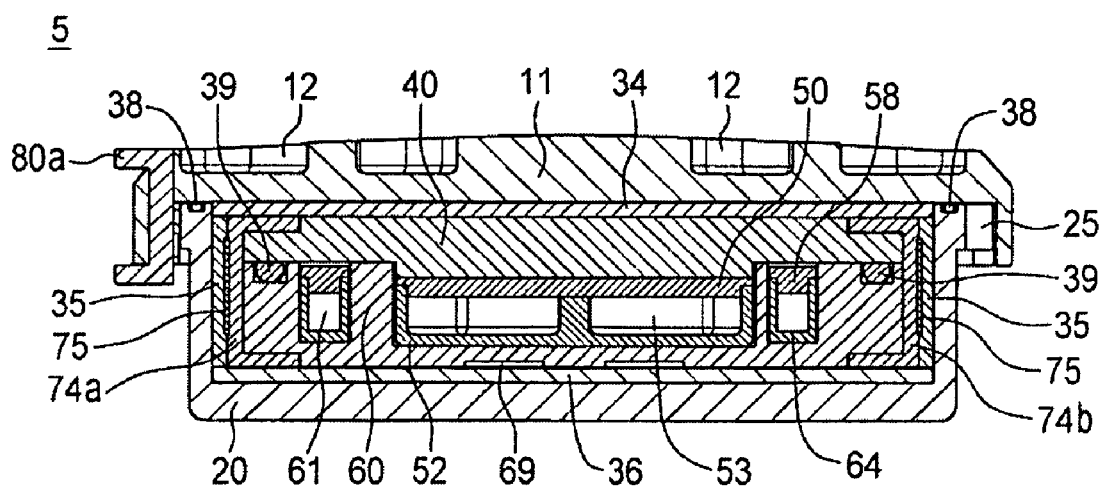
FIG. 7B is a cross-sectional view of the LIFE capsule in accordance with an embodiment of the present invention.

The example of FIGS. 7A-7B of the LIFE capsule 5 has a diameter of approximately 56 mm with a maximum vertical thickness of 18 mm and a mass of 100 grams or less for outer space applications. As shown in FIG. 7A, a side view of the LIFE capsule 5 illustrates the upper housing portion 11 and the lower housing portion 20 in accordance with an embodiment of the present invention. Furthermore, the safety wires 80a, 80b, 80c (not shown in this FIG.) are securely inserted through the apertures 9a, 9b, 9c of the upper housing portion 11 and the apertures 29a, 29b, 29c of the receiving means 25a, 25b, 25c of the lower housing portion 20 to allow safety wires 80a, 80b, 80c (shown in FIG. 3) to fit therethrough for providing additional safety and precautionary retaining measures against the upper housing portion 11 from blowing out or away from the lower housing portion 20 under high pressure and impact.

FIG. 7B is a cross-sectional view of the LIFE capsule in accordance with an embodiment of the present invention. The safety wire 80a is shown to fit through the aperture 29a of the upper housing portion 11 and the aperture 29a of the lower housing portion 20. Immediately underneath the outer housing, the shock absorbing layer comprised of the upper shock absorbing layer 34, side shock absorbing layer 35 and lower shock absorbing layer 36 are illustrated to mitigate and absorb the extreme impact and landing shock and to protect the internal components and samples. The inner carrier 43 comprised of the top member 40 and the base member 60 are shown containing the small volume of samples in the interior space 61 of the plurality of small containers 64 and larger samples in the interior cavity 53 of the large container. The larger sample is contained within the lower large container portion 52 of the large container and tightly closed and sealed with the cover 50 on top. The smaller samples are contained and sealed within each of the plurality of small containers 64 and capped either by a cap 64a as shown in FIG. 5 or alternatively, by each of the plurality of caps 58 that is integral and attached to the underside surface of the top member 40 to fit over each of the plurality of small containers 64 or into the interior space 61 of the small containers 64. The larger samples are contained and sealed within the lower larger container portion 52 and capped either by a cover 50 or alternatively, by a cover that is integral and attached to the underside surface of the top member 40 to fit over the lower larger container portion 52. The lower large container portion 52 optionally has separable compartments for accommodating different large samples.

For providing the first sealing mechanism, the small and large samples are securely contained within the plurality of small containers 64 and lower larger container portion 52 which are tightly capped with the caps 64a or 58, and cover 50. For providing the secondary sealing mechanism, the second sealing means 39 is inserted into the groove 73 (shown in FIG. 6D) of the outer topside surface 70 of the base member 60 to sandwich and tightly seal the top member 40 against the base member 60. The top and base members 40, 60 are tightly sealed and engaged by the plurality of retaining members 74a, 74b, 74c, 74d (only 74a and 74b are shown) to provide pressure to seal the top member 40 and the base member 60 against each other by pressing the two parts together against the second sealing means 39. The top and base members 40, 60 retained by the plurality of retaining members 74a, 74b, 74c, 74d are additionally and securely retained in place by another sealing means, or a retaining tape 75 by circumferentially and tightly surrounding or adhering the side surfaces of the top member 40 and base member 60 pressed by the plurality of retaining members 74a, 74b, 74c, 74d.

For providing the tertiary sealing mechanism, the entirely assembled and sealed inner carrier 43 is inserted into the lower housing portion 20 and the third sealing means, a circular wire 38 is inserted into the groove 79 (shown in FIG. 3) before securely engaging the upper housing portion 11 and the lower housing portion 20. As shown in FIG. 7B, the third sealing means 38 is permanently crushed to seal the outer housing 10 between the upper housing and lower housing portions 11, 20. Simultaneously, a third sealing means by aligning the upper locking means 15a, 15b, 15c over the lower receiving means 25a, 25b, 25c, the locking means 15a, 15b, 15c can be slidably rotated on and over the receiving means 25a, 25b, 25c until the locking means 15a, 15b, 15c of the upper housing portion 11 are securely engaged and locked with the receiving means 25a, 25b, 25c of the lower housing portion 20 is provided to complete the tertiary sealing mechanism.

After the upper and lower housing portions 11, 20 are securely and permanently attached, the apertures 9a, 9b, 9c of the upper housing portion 11 and the apertures 29a, 29b, 29c of the lower housing portion 20 with vertical alignment allow the safety wires 80a, 80b, 80c to provide additional containment to the LIFE capsule 5. By implementing the three sealing mechanisms using the different structures with materials as described, structural and sealing integrity is maintained for an extended period of time after being subjected to extreme conditions. The outer housing 10 can additionally include a coating of thermal paint to detect extreme temperature changes. The at least triple sealing mechanisms ensure that the samples contained within do not leak out nor contaminate the environment in which the LIFE capsule 5 may be exposed and provides hermetic sealing against extreme conditions of deep space or here on Earth.

Accordingly, it is intended to be understood that all matter contained in the above description and shown in the accompanying drawings shall be interpreted as illustrative and not in a limiting sense. The description and accompanying drawings of the invention is not limited to the specific means or features shown or described.

What is claimed is:

1. An apparatus for protecting a plurality of samples, the apparatus comprising:
    (a) an outer housing comprised of an upper housing portion and a lower housing portion;
    (b) a shock absorbing layer positioned between the upper and lower portions of the outer housing;
    (c) an inner carrier comprised of a top member and a base member inserted within the outer housing;
    (d) a first sealing means to seal the plurality of samples in position in a plurality of openings in the base member;
    (e) a second sealing means to seal the top member and the base member together;
    (f) a third sealing means to seal the upper housing portion and the lower housing portion together;
    whereby the apparatus is capable of withstanding an impact of up to 4000 G and wherein the apparatus is subjected to extreme conditions for an extended period of time.

2. The apparatus of claim 1, wherein the apparatus has a mass of less than 100 grams.

3. The apparatus of claim 1, wherein the outer housing is generally a cylindrical configuration.

4. The apparatus of claim 1, wherein the plurality of samples are in the form of liquid and solid samples.

5. The apparatus of claim 4, wherein the plurality of openings hold a plurality of small containers and a large container positioned in a plurality of small openings and a large opening respectively.

6. The apparatus of claim 5, wherein each of the plurality of small containers and the large container hold the liquid and solid samples so as to isolate them from each other to prevent contamination.

7. The apparatus of claim 5, wherein the first sealing means comprises a means for sealing each of the plurality of small containers and the large container positioned in the plurality of small openings and the large opening by capping each of a body of the plurality of small containers and a lower large container portion of the large container.

8. The apparatus of claim 5, wherein the first sealing means comprises a means for sealing the plurality of small openings and the large opening by capping the openings.

9. The apparatus of claim 1, wherein the second sealing means comprises a plurality of retaining members circumferentially placed in a plurality of recesses on outer edges of the inner carrier and approximately evenly spaced so as to compress the top member and the base member, and an o-ring positioned between the top and base members.

10. The apparatus of claim 9, wherein the second sealing means further comprises a retaining tape to circumferentially adhere around side surfaces of the top member and the base member compressed by the retaining members.

11. The apparatus of claim 9, wherein the retaining members are substantially C-shaped metal clips.

12. The apparatus of claim 9, wherein the o-ring is made from a polymer material.

13. The apparatus of claim 1, wherein the third sealing means comprises a means for compressing the upper housing portion and the lower housing portion, with a malleable wire positioned in between.

14. The apparatus of claim 13, wherein the wire is an Indium containing wire.

15. The apparatus of claim 13, wherein the third sealing means also comprises slidably rotating at least two locking means integrally positioned on the upper housing portion and engaging at least two receiving means integrally positioned on the lower housing portion, with the wire in between the upper and lower housing portions to seal the outer housing when the upper and lower housing portions are compressed together.

16. An apparatus for protecting a plurality of samples, the apparatus comprising:

(a) an outer housing comprised of an upper housing portion and a lower housing portion, the upper housing portion comprising at least two locking means integrally positioned on an outer underside of the upper housing portion, the lower housing portion comprising at least two receiving means integrally positioned on an upper side surface of the lower housing portion to engage with the at least two locking means;

(b) a shock absorbing layer positioned between the upper and lower housing portions of the outer housing, the shock absorbing layer comprising an upper shock absorbing layer, a side shock absorbing layer, and a lower shock absorbing layer;

(c) an inner carrier comprised of a top member and a base member inserted within the outer housing with the shock absorbing layer, the top member with a plurality of recesses located circumferentially and the base member with the plurality of recesses located circumferentially for engaging a plurality of retainer members;

(d) a first sealing means to seal the plurality of samples in position in a plurality of small containers and a large container in the base member by capping the plurality of small containers and the large container;

(e) a second sealing means to seal the top member and the base member together, the second sealing means comprising means for positioning the plurality of retaining members circumferentially placed and approximately evenly spaced in a plurality of recesses on the outer edges of the inner carrier to compress the top member and the base member together with an o-ring placed between the top and base members;

(f) a third sealing means to seal the upper housing portion and the lower housing portion, the third sealing means comprises compressing the upper housing portion and the lower housing portion with a malleable wire positioned in between the upper and lower housing portions while slidably engaging the at least two locking means and the at least two receiving means; and whereby the apparatus is capable of withstanding an impact of up to 4000 G and wherein the apparatus stays hermetically sealed after being subjected to extreme conditions for an extended period of time.

17. The apparatus of claim 16, wherein the apparatus has a mass of less than 100 grams.

18. The apparatus of claim 16, wherein the plurality of samples are in the form of liquid and solid samples wherein each of the plurality of small containers and the large container hold the liquid and solid samples so as to isolate them from each other to prevent contamination.

19. The apparatus of claim 16, wherein the base member has a cavity located underside of the base member for placing a dosimeter strip for detecting radiation.

20. A method for assembling an apparatus to protect a plurality of liquid and solid samples contained within the apparatus to withstand an impact of up to 4000 G and subjected to extreme conditions for an extended period of time, the method comprising:

(a) inserting each of the plurality of liquid and solid samples separately into a plurality of small containers and a large container into a plurality of openings of a base member of an inner carrier;

(b) sealing the plurality of small containers and the large container positioned within the plurality of openings of the base member containing the plurality of liquid and solid samples by tightly capping the plurality of small containers and the large container;

(c) positioning a polymer o-ring in a groove between a top member and the base member of the inner carrier;

(d) compressing the top member and the base member of the inner carrier together with the polymer o-ring between the top and base members and by placing a plurality of retaining members positioned circumferentially on outer edges of the inner carrier and approximately evenly spaced;

(e) placing a retainer tape circumferentially around a side surface of the inner carrier and over the plurality of retaining members and the top and base members;

(f) inserting the sealed inner carrier into a lower housing portion of an outer housing;

(g) compressing an upper housing portion and the lower housing portion with an Indium containing wire positioned in a groove between the upper housing and lower housing portions; inserting a shock absorbing layer positioned between the upper and lower housing portions and (h) simultaneously slidably engaging at least two locking means integral with the upper housing portion with at least two receiving means integral with the lower housing portion.

21. The method of claim 20, further comprising the step of coating the outer housing with a thermal paint for detecting extreme temperature changes.

22. The method of claim 20, further comprising the step of placing a plurality of safety wires through apertures integrally located and evenly spaced on outer edges of the upper housing portion and apertures integrally located on the at least two receiving means of the lower housing portion as an additional retaining means.

* * * * *